United States Patent
Elia et al.

(10) Patent No.: US 8,642,195 B2
(45) Date of Patent: Feb. 4, 2014

(54) MODULAR CID ASSEMBLY FOR A LITHIUM ION BATTERY

(75) Inventors: Mimmo Elia, Belmont, MA (US);
Jan-Roger Linna, Boston, MA (US);
Phillip E. Partin, Grafton, MA (US);
Raymond G. Kairawicz, Watertown, CT (US)

(73) Assignee: Boston-Power, Inc., Westborough, MA (US)

(*) Notice: Subject to any disclaimer, the term of this patent is extended or adjusted under 35 U.S.C. 154(b) by 817 days.

(21) Appl. No.: 12/695,803

(22) Filed: Jan. 28, 2010

(65) Prior Publication Data

US 2010/0178539 A1 Jul. 15, 2010

Related U.S. Application Data

(63) Continuation-in-part of application No. 12/641,871, filed on Dec. 18, 2009, now abandoned.

(60) Provisional application No. 61/203,157, filed on Dec. 19, 2008, provisional application No. 61/166,580, filed on Apr. 3, 2009, provisional application No. 61/206,461, filed on Jan. 30, 2009.

(51) Int. Cl.
*H01M 2/12* (2006.01)

(52) U.S. Cl.
USPC .......................................................... 429/56

(58) Field of Classification Search
USPC .................. 429/163–187, 50–52, 53–56
See application file for complete search history.

(56) References Cited

U.S. PATENT DOCUMENTS 4,025,696 A 5/1977 Tucholski et al.
4,028,478 A 6/1977 Tucholski
(Continued)

FOREIGN PATENT DOCUMENTS

| CA | 2099657 | 2/1994 |
|---|---|---|
| CA | 2163187 | 5/1997 |

(Continued)

OTHER PUBLICATIONS

Notice of Allowance and Fee(s) Due for U.S. Appl. No. 12/214,535, Date Mailed: Jul. 16, 2010.

(Continued)

*Primary Examiner* — Patrick Ryan
*Assistant Examiner* — Kiran Quraishi
(74) *Attorney, Agent, or Firm* — Hamilton, Brook, Smith & Reynolds, P.C.

(57) ABSTRACT

A modular current interrupt device includes an electrically-conductive rupture disc, an electrically-conductive pressure disc attached to the rupture disc to form an electrical pathway. An electrically-insulating ring partitions a perimeter of the rupture disc from a perimeter of the pressure disc, and a seating element secures the electrically-insulated ring to the pressure disc. At least one of the rupture disc and electrically-insulating ring defines a conduit, whereby exposure of one side of the pressure disc to sufficient force through the conduit causes the pressure disc to separate from the rupture disc to thereby sever the electrical pathway. A low pressure current interrupt device (CID) activates at a minimal threshold internal gauge pressure in a range of, for example, between about 4 kg/cm² and about 9 kg/cm². Preferably, the CID includes a pressure disc that includes a frustum having a first end and a second end, a base extending radially from a perimeter of the first end of the frustum, and an essentially planar cap sealing the second end of the frustum. The first end has a broader diameter than the second end, with a cross-section of at least one of the first and second end being non-circular.

56 Claims, 10 Drawing Sheets

(56) References Cited

U.S. PATENT DOCUMENTS

| | | | |
|---|---|---|---|
| 4,576,303 A | 3/1986 | Mundt et al. | |
| 4,787,180 A | 11/1988 | Robinson et al. | |
| 4,788,112 A | 11/1988 | Kung | |
| 4,838,447 A | 6/1989 | Albracht et al. | |
| 4,943,497 A | 7/1990 | Oishi et al. | |
| 4,951,697 A | 8/1990 | Fritts | |
| 4,978,947 A | 12/1990 | Finnegan | |
| 5,036,632 A | 8/1991 | Short, III et al. | |
| 5,082,133 A | 1/1992 | Farwell et al. | |
| 5,418,082 A | 5/1995 | Taki | |
| 5,570,803 A | 11/1996 | Farwell | |
| 5,585,207 A | 12/1996 | Wakabe et al. | |
| 5,678,307 A | 10/1997 | Farwell | |
| 5,691,073 A | 11/1997 | Vu et al. | |
| 5,705,290 A | 1/1998 | Azena | |
| 5,707,756 A | 1/1998 | Inoue et al. | |
| 5,738,952 A | 4/1998 | Abe | |
| 5,741,606 A | 4/1998 | Mayer et al. | |
| 5,744,261 A | 4/1998 | Muffoletto et al. | |
| 5,750,277 A | 5/1998 | Vu et al. | |
| 5,776,627 A | 7/1998 | Mao et al. | |
| 5,800,939 A | 9/1998 | Mishina et al. | |
| 5,821,008 A | 10/1998 | Harada et al. | |
| 5,853,912 A | 12/1998 | Naing et al. | |
| 5,869,208 A | 2/1999 | Miyasaka | |
| 5,879,832 A | 3/1999 | Vu et al. | |
| 5,879,834 A | 3/1999 | Mao et al. | |
| 5,958,617 A | 9/1999 | Kozuki et al. | |
| 5,962,167 A | 10/1999 | Nakai et al. | |
| 6,033,797 A | 3/2000 | Mao et al. | |
| 6,063,518 A | 5/2000 | DeWulf et al. | |
| 6,065,485 A | 5/2000 | Rooker | |
| 6,087,036 A | 7/2000 | Rouillard et al. | |
| 6,114,942 A | 9/2000 | Kitamoto et al. | |
| 6,165,637 A | 12/2000 | Azema | |
| 6,204,635 B1 * | 3/2001 | Sullivan | 320/134 |
| 6,228,523 B1 | 5/2001 | Azema | |
| 6,274,264 B1 | 8/2001 | Azema | |
| 6,296,965 B1 | 10/2001 | Azema | |
| 6,296,970 B1 * | 10/2001 | Killebrew et al. | 429/158 |
| 6,346,344 B1 | 2/2002 | Song et al. | |
| 6,376,120 B1 | 4/2002 | Azema | |
| 6,399,237 B1 | 6/2002 | Souliac et al. | |
| 6,403,250 B1 | 6/2002 | Azema et al. | |
| 6,537,693 B1 * | 3/2003 | Suzuki et al. | 429/56 |
| 6,632,572 B1 | 10/2003 | Takahashi et al. | |
| 6,730,430 B2 | 5/2004 | Chang | |
| 6,805,991 B2 | 10/2004 | Abe | |
| 6,878,481 B2 | 4/2005 | Bushong et al. | |
| 6,900,616 B2 | 5/2005 | Burrus, IV et al. | |
| 7,175,935 B2 | 2/2007 | Welsh | |
| 7,288,920 B2 | 10/2007 | Bushong et al. | |
| 7,335,439 B2 | 2/2008 | Kawano et al. | |
| 7,763,375 B2 | 7/2010 | Igoris et al. | |
| 7,763,386 B2 | 7/2010 | Hosoya et al. | |
| 7,838,143 B2 | 11/2010 | Onnerud et al. | |
| 8,012,615 B2 | 9/2011 | Onnerud et al. | |
| 8,071,233 B2 | 12/2011 | Partin et al. | |
| 2002/0004169 A1 | 1/2002 | Yamada et al. | |
| 2002/0051905 A1 | 5/2002 | Kitoh et al. | |
| 2003/0180615 A1 | 9/2003 | Johnson et al. | |
| 2004/0115523 A1 | 6/2004 | Hommura et al. | |
| 2004/0228061 A1 | 11/2004 | Kim et al. | |
| 2004/0232888 A1 | 11/2004 | Burrus, IV et al. | |
| 2004/0234842 A1 | 11/2004 | Kawano et al. | |
| 2005/0214634 A1 * | 9/2005 | Kim | 429/53 |
| 2005/0233217 A1 | 10/2005 | Fujihara et al. | |
| 2006/0019150 A1 | 1/2006 | Rigobert et al. | |
| 2006/0051666 A1 | 3/2006 | Kim | |
| 2006/0083984 A1 | 4/2006 | Oh et al. | |
| 2006/0115713 A1 | 6/2006 | Kim et al. | |
| 2006/0121336 A1 | 6/2006 | Yoon | |
| 2006/0216588 A1 | 9/2006 | Kim et al. | |
| 2006/0257745 A1 | 11/2006 | Choi et al. | |
| 2006/0275657 A1 * | 12/2006 | Kozuki et al. | 429/185 |
| 2007/0026315 A1 | 2/2007 | Lampe-Onnerud et al. | |
| 2007/0298314 A1 | 12/2007 | Partin et al. | |
| 2008/0008928 A1 * | 1/2008 | Partin et al. | 429/61 |
| 2008/0289945 A1 * | 11/2008 | Brazier et al. | 200/83 R |
| 2009/0029193 A1 | 1/2009 | Onnerud et al. | |
| 2009/0117451 A1 | 5/2009 | Jung | |
| 2009/0269654 A1 | 10/2009 | Kairawicz et al. | |
| 2010/0143770 A1 | 6/2010 | Onnerud et al. | |
| 2011/0024396 A1 | 2/2011 | Onnerud et al. | |
| 2011/0189512 A1 | 8/2011 | Onnerud et al. | |
| 2012/0129019 A1 | 5/2012 | Onnerud et al. | |

FOREIGN PATENT DOCUMENTS

| | | |
|---|---|---|
| CN | 1372341 | 10/2002 |
| CN | 1435908 | 8/2003 |
| CN | 101479865 | 4/2009 |
| CN | 101803070 | 8/2010 |
| EP | 0863559 | 9/1998 |
| EP | 0930662 | 7/1999 |
| EP | 0 959 508 A1 | 11/1999 |
| EP | 0 969 535 A1 | 1/2000 |
| EP | 1429402 | 6/2004 |
| EP | 1482577 | 12/2004 |
| JP | 10-172528 A | 6/1998 |
| JP | 11003698 | 1/1999 |
| JP | 2002025526 | 1/2002 |
| TW | 200908415 | 2/2009 |
| WO | WO 98/45888 | 10/1998 |
| WO | WO 2006/071972 | 7/2006 |
| WO | WO 2007/072759 A1 | 6/2007 |
| WO | WO 2007/149102 A1 | 12/2007 |
| WO | WO 2008/002487 | 1/2008 |
| WO | WO 2008/069476 A1 | 6/2008 |
| WO | WO 2008/140702 | 11/2008 |
| WO | WO 2009/002438 A1 | 12/2008 |
| WO | WO 2009/131894 | 10/2009 |
| WO | WO 2010/080588 A1 | 7/2010 |
| WO | WO 2010/088332 A1 | 8/2010 |

OTHER PUBLICATIONS

Non-Final Office Action for U.S. Appl. No. 12/623,153, Date Mailed: Sep. 1, 2010.
Written Opinion of the International Preliminary Examining Authority for Int'l Application No. PCT/US2009/040839, Date Mailed: May 4, 2010.
Notification of Transmittal of the International Preliminary Report on Patentability for Int'l Application No. PCT/US2009/040839, Date Mailed: Jul. 28, 2010.
Notification of Transmittal of the International Search Report and the Written Opinion of the International Searching Authority for Int'l Application No. PCT/US2010/022327; Date Mailed: Mar. 26, 2010.
Arc-Welding Fundamentals, published in 1994 by the Lincoln Electric Company.
Final Office Action from 3853.1015-001, Date of Mailing Jan. 15, 2010.
International Preliminary Report on Patentability from PCT/US2008/007666. Date of Mailing Jul. 14, 2009.
International Preliminary Report on Patentability from PCT/US2007/014592. Date of Mailing Oct. 28, 2008.
International Preliminary Report on Patentability from PCT/US2009/068679. Date of Mailing Apr. 1, 2011.
International Search Report and Written Opinion from PCT/US2008/007666. Date of Mailing Oct. 13, 2008.
International Search Report and Written Opinion from PCT/US2009/068679. Date of Mailing Mar. 18, 2010.
International Search Report from PCT/US2009/040839. Date of Mailing Jun. 17, 2009.
International Search Report from PCT/US2007/014592. Date of Mailing Mar. 20, 2008.
Office Action from U.S. Appl. No. 11/821,585. Date of Mailing Nov. 9, 2010.
Office Action from U.S. Appl. No. 12/214,535. Date of Mailing Jul. 20, 2009.

(56) References Cited

OTHER PUBLICATIONS

Office Action from U.S. Appl. No. 12/902,358. Date of Mailing Nov. 22, 2010.
International Search Report and Written Opinion from PCT/US2010/022327. Date of Mailing Mar. 26, 2010.
Office Action from U.S. Appl. No. 13/017,151. Date of Mailing May 23, 2011.
Written Opinion of the International Preliminary Examining Authority from PCT/US2007/014592. Date of Mailing Sep. 22, 2008.
Notice of Allowance and Fee(s) Due for U.S. Appl. No. 12/902,358. Date of Mailing, Jul. 5, 2011.
Notice of Allowance and Fee(s) Due for U.S. Appl. No. 11/821,585. Date of Mailing, Sep. 1, 2011.
International Preliminary Report on Patentability from PCT/US2010/022327.

* cited by examiner

MODULAR CID ASSEMBLY FOR A LITHIUM ION BATTERY

RELATED APPLICATION(S)

This application is a continuation-in-part of U.S. application Ser. No. 12/641,871, filed Dec. 18, 2009, now abandoned which claims the benefit of U.S. Provisional Application No. 61/203,157, filed on Dec. 19, 2008 and U.S. Provisional Application No. 61/166,580, filed Apr. 3, 2009. This application also claims the benefit of U.S. Provisional Application No. 61/206,461, filed on Jan. 30, 2009. The entire teachings of the above applications are incorporated herein by reference.

BACKGROUND OF THE INVENTION

Li-ion batteries in portable electronic devices typically undergo different charging, discharging and storage routines based on their use. Batteries that employ Li-ion cell chemistry will produce gas when they are electrically overcharged beyond established safety limits. This gas may be used to trigger pressure activated safety devices to improve the reliability and safety of batteries. A current interrupt device (CID) is typically employed to provide protection against any excessive internal pressure increase in a battery by interrupting the current path from the battery when pressure inside the battery is greater than a predetermined value. The CID typically includes a rupture disc and a pressure disc in electrical communication with each other. The rupture disc and the pressure disc are, in turn, in electrical communication with an electrode and a terminal of the battery, respectively. The pressure disc separates from (e.g., deforms away or is detached from) the rupture disc of the CID when pressure inside the battery is greater than a predetermined value, whereby a current flow between the electrode and the terminal is interrupted.

Generally, however, CIDs known in the art activate at a relatively high pressure, for example, at an internal gauge pressure greater than about 15 kg/cm$^2$. Typically, when any excessive internal pressure increase that triggers such CID activation occurs, the internal temperature of the battery is also relatively high, causing additional safety issues. High temperatures are a particular concern in relatively large cells, such as cells larger than "18650" cells (which have an outer diameter of about 18 mm and a length of 65 mm).

Further, CIDs typically are fabricated in conjunction with fabrication of the remainder of the battery and require a low tolerance for variation to ensure activation at an appropriate pressure. In some designs the surface area available for welding of a tab from the jelly roll of a battery typically is limited due to need to provide gas pressure conduits. The gas pressure conduits in the disc often includes at least one through-hole that must not be blocked during welding of tabs from the jellyroll to the rupture disc.

The surface area of the pressure disc is one of the factors that affect its actuation or reversal pressure, material thickness being another. In prismatic or non-circular cells, the shortest side of the cell typically dictates the maximum size of a circular pressure disc that can be used. Within the envelope of any given prismatic cell design, it is possible to achieve lower activation or reversal pressures by using an elongated pressure disc (oblong, oval, etc.) compared to a circular pressure disc of the same material thickness.

Therefore, there is a need for CIDs for batteries, particularly relatively large lithium-ion batteries, that can reduce or minimize the aforementioned problems.

SUMMARY OF THE INVENTION

The present invention generally is directed to a modular current interrupt device, a battery that includes a modular current interrupt device of the invention, and a method of forming a modular current interrupt device of the invention.

The modular current interrupt device includes an electrically-conductive rupture disc and an electrically-conductive pressure disc attached to the rupture disc to form an electrical pathway. An electrically-insulating ring partitions a perimeter of the rupture disc from a perimeter of the pressure disc. A seating element of the current interrupt device secures the electrically-insulating ring to the pressure disc. At least one of the ruptured discs and the electrically-insulating ring defines a conduit, whereby exposure of one side of the pressure disc to sufficient pressure through the conduit will cause the pressure disc to separate from the rupture disc to thereby sever the electrical pathway. The seating element can be electrically conductive and electrically connected to the pressure disc. The rupture disc and the electrically-insulating ring together can define the conduit. The rupture disc can include a plurality of retention points that form an interference fit with the electrically-insulating ring. The perimeter of the rupture disc can be a polygon. The polygon can define the retention points. The polygon can have from 10 sides to 20 sides, such as 14 sides. In some embodiments, the conduit can be defined in part by the perimeter of the rupture disc. The perimeter of the rupture disc can be beveled. In some embodiments, the perimeter of the rupture disc can include a double bevel. The angle of at least one of the bevels can be in a range of between about 40 degrees and about 55 degrees, such as about 47 degrees. In some embodiments, the angle of both bevels can be about 47 degrees. In some embodiments, the electrically insulating ring can define a lip at a periphery of the ring, whereby the lip overlaps the periphery of the rupture disc. In these embodiments, the rupture disc can define a groove at the periphery of the rupture disc, whereby the lip of the insulating ring overlaps the rupture disc at the groove, and a surface of the lip of the insulating ring can be essentially flush with a surface of the rupture disc. In some embodiments, the electrically insulating ring can define at least one channel that, together with the rupture disc, defines at least a portion of the conduit. The channel can have a major axis that is essentially normal to a tangent of a circle defined by the electrically-insulating ring. In some embodiments, the rupture disc, the pressure disc and the seating element can be aluminum. The electrically-insulating ring can include a polymer.

In certain embodiments, the rupture disc can define at least one conduit. Alternatively, the electrically-insulating ring defines at least one conduit at a periphery of the ring, whereby fluid communication exists between a frustoconical component of the pressure disc and an external surface of the current interrupt device. The pressure disc can further include an elevated surface and a peripheral base, the elevated surface being linked to the peripheral base by the frustoconical component, and wherein the rupture disc is electrically connected to the pressure disc at the elevated surface. The pressure disc can be electrically connected to the rupture disc at least one point. The point can include a weld. In some embodiments, the seating element can be electrically-conductive. In those embodiments, the pressure disc can be in electrical communication with the seating element, and the seating element can secure the electrically-insulating ring to the pressure disc by a crimp at a periphery of the seating device. In some embodiments, the seating element can define a seating element conduit. In other embodiments, the rupture disc can define the conduit. The electrical connection between the rupture disc and the pressure disc is severed when a gauge pressure applied to a surface of the pressure disc facing the rupture disc is in a range of between about 4 kg/cm$^2$ and about 9 kg/cm$^2$ or between about 7 kg/cm$^2$ and about 9 kg/cm$^2$.

In another embodiment, the invention is a battery, such as a lithium-ion based battery, that includes a modular current interrupt device, wherein the current interrupt device includes an electrically-conductive rupture disc and an electrically-conductive pressure disc attached to the rupture disc to form an electrical pathway. An electrically-insulating ring partitions a perimeter of the rupture disc from the perimeter of the pressure disc. A seating element of the current interrupt device secures the electrically-insulating ring to the pressure disc. At least one of the rupture disc and the electrically-insulating ring define a conduit, whereby exposure of one side of the pressure disc to sufficient pressure through the conduit will cause the pressure disc to separate from the rupture disc to thereby sever an electrical pathway. In some embodiments, the modular current interrupt device is at a recessed portion of a lid of the battery, the recessed portion defining an opening in the lid. The modular current interrupt device can be a component of a positive terminal of the battery. In those embodiments, at least one lead of a positive terminal of the battery can be in electrical communication with the rupture disc of the modular current interrupt device. The battery can further include a first terminal in electrical communication with a first electrode of the battery, a second terminal in electrical communication with a second electrode of the battery, and a battery can having a cell casing and a lid which are in electrical communication with each other, the battery can being electrically insulated from the first terminal, wherein at least a portion of the battery can is at least a component of the second terminal, or is electrically connected to the second terminal. In some embodiments, the cell casing can be a prismatic cell casing. In certain embodiments, the current interrupt device can be in electrical communication with the battery can. In those embodiments, the current interrupt device can be in electrical communication with the lid of the battery can, and the lid can include a recess facing toward the pressure disc. The recess can be co-terminous with the perimeter of the first end of a frustum variant.

In still another embodiment, a method of forming a modular current interrupt device includes combining a pressure disc and a seating element of the current interrupt device, and combining a rupture disc and an electrically-insulating ring. The combined pressure disc and seating element and the combined rupture disc and electrically-insulating ring are then assembled, and the rupture disc is laser or resistance spot welded to the pressure disc to form an electrical pathway therebetween. A battery can be formed by subsequently placing the modular current interrupt device within a recessed portion of a lid of the battery, wherein the recessed portion defines an opening of the lid. The method can further include the step of joining the seating element to the lid at the recessed portion of the lid. The electrical communication can be interrupted when a gauge pressure between the discs is in a range of, for example, between about 4 kg/cm$^2$ and about 10 kg/cm$^2$ or between about 4 kg/cm$^2$ and about 9 kg/cm$^2$. The method can further include the step of forming at least one venting means on the cell casing, wherein gaseous species inside the battery exit through the venting means when an internal gauge pressure is in a range of between about 10 kg/cm$^2$ and about 20 kg/cm$^2$.

In yet another embodiment, the present invention is directed to a CID comprising a pressure disc that includes a frustum variant having a first end and a second end, wherein a cross-section of at least one of the first or second ends is non-circular. A base extends radially from a perimeter of the first end of the frustum variant, and an essentially planar cap seals the second end of the frustum variant. The first end has broader dimensions than the second end. The rupture disc is in electrical contact with the essentially planar cap, preferably through a weld. The cross-section at least one of the first end and second end can be oblong. In some embodiments, the cross-section of both the first and second end can be non-circular. In other embodiments, the cross-section of both the first and second end can be oblong. The pressure disc and the rupture disc can be bonded together by at least one weld, and the rupture disc can define at least one opening. The rupture disc can define a depression, and the weld can be at the depression. The weld can be at least one spot weld. In some embodiments, at least one of the spot welds can include aluminum. In certain embodiments, the weld can be two spot welds. At least one of the pressure disc and the rupture disc include aluminum. In some embodiments, both the pressure disc and the rupture disc can include aluminum. In certain embodiments, the thickness of the cap can be in a range of between about 0.05 millimeter and about 0.5 millimeter, such as about 0.127 millimeter. The diameter of the cap can be in a range of between about 2 millimeters and about 8 millimeters. The height of the cap from the base can be in a range of between about 0.5 millimeter and about 1 millimeter, such as about 0.762 millimeter. The frustum variant can have an angle to a plane parallel to the base of the pressure disc in a range of between about 15 degrees and about 25 degrees. In some embodiments, an electrically insulating ring can extend about the perimeter of the frustum variant and between the base of the pressure disc and the rupture disc. In those embodiments, the base of the pressure disc can include at least one tab and the electrically insulating ring can define at least one opening, the tab and the opening being capable of alignment when the insulating ring and the base are concentric, wherein the tab can be malleably adjusted to secure the insulating ring to the pressure disc. The electrically insulating ring can define a groove about a perimeter of the insulating ring. These embodiments can further include a metal ring having tabs, whereby the metal ring can rest inside the groove and whereby the tabs can be malleably adjusted and secured to a metal surface on which the pressure disc is resting, thereby securing the insulating ring over the pressure disc. The thickness of the rupture disc proximate to the weld with the pressure disc can be less than the thickness of the pressure disc proximate to the weld, more preferably equal to or less than one-half of the thickness of the pressure disc proximate to the weld. The weld connecting the pressure disc and the rupture disc ruptures when a gauge pressure between the discs is in a range of between about 4 kg/cm$^2$ and about 9 kg/cm$^2$, preferably in a range of between about 5 kg/cm$^2$ and about 9 kg/cm$^2$, more preferably in a range of between about 7 kg/cm$^2$ and about 9 kg/cm$^2$.

This invention has many advantages. For example, the modular current interrupt device can be fabricated separately from the lithium ion battery, thereby significantly reducing the costs of fabrication of the battery and increasing the types of applications to which the modular CID can be applied. Further, the modular CID includes a significantly increased surface area relative to typical conventional current interrupt devices for welding a tab from a cell jellyroll and, consequently, significantly increasing battery yield during production. In addition, in certain embodiments, because a conduit is defined by both a pressure disc and an electrically-insulating ring, the pressure disc does not need to include through-holes to allow passage of gas, thereby eliminating the likelihood of blockage of the hole during welding of a tab from a cell jellyroll. Also, the modular current interrupt device of the invention can be universal in at least one orientation, such as by having a circular shape, thereby eliminating the need to orient the current interrupt device during assembly. The likelihood of error during fabrication and consequent rejection during quality checks is thereby significantly reduced. A beveled edge on the rupture disc, in one embodiment, defines a channel and provides a means to mechanically secure the rupture disc to an electrically-insulating ring of the current interrupt device, thereby eliminating the need for the rupture disc to define through-holes to communicate gas pressure to the pressure disc.

An advantage of an elongated, non-circular pressure disc is that within the envelope of any given prismatic cell design, it is possible to achieve lower activation or reversal pressures by using an elongated pressure disc (oblong, oval, etc.) compared to a circular pressure disc of the same material thickness.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
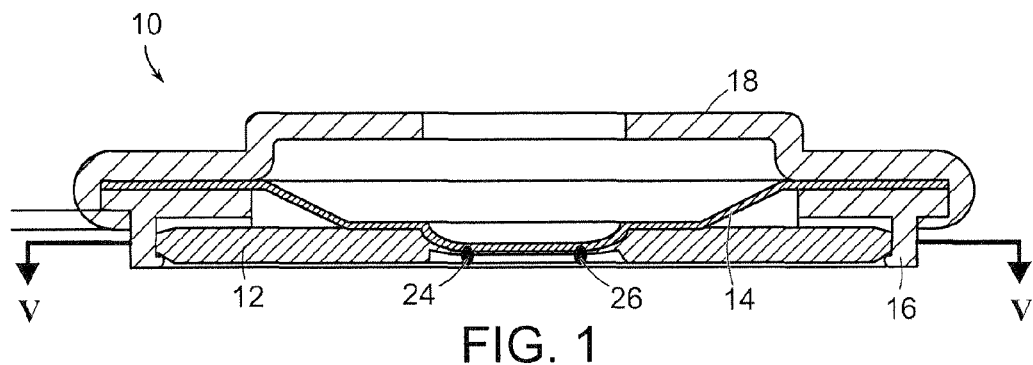
FIG. 1 is a cross-sectional view of one embodiment of a modular current interrupt device of the invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The invention generally is directed to a modular current interrupt device for a battery, such as a lithium ion battery, and, particularly, a prismatic lithium ion battery. In another embodiment, the invention is a battery that includes the modular current interrupt device. In still another embodiment, the invention is a method of fabricating a modular current interrupt device.

As used herein, the "terminals" of the batteries of the invention mean the parts or surfaces of the batteries to which external electric circuits are connected. Also, as used herein, the phrases "electrically connected" or "in electrical communication" or "electrically contacted" mean certain parts are in communication with each other by flow of electrons through conductors, as opposed to electro-chemical communication which involves flow of ions, such as $Li^+$, through electrolytes.

FIG. 1 is a cross-sectional view of one embodiment of modular current interrupt device 10, and includes electrically-conductive rupture disc 12, electrically-conductive pressure disc 14, electrically-insulating ring 16, and seating element 18.

Figure 2A:
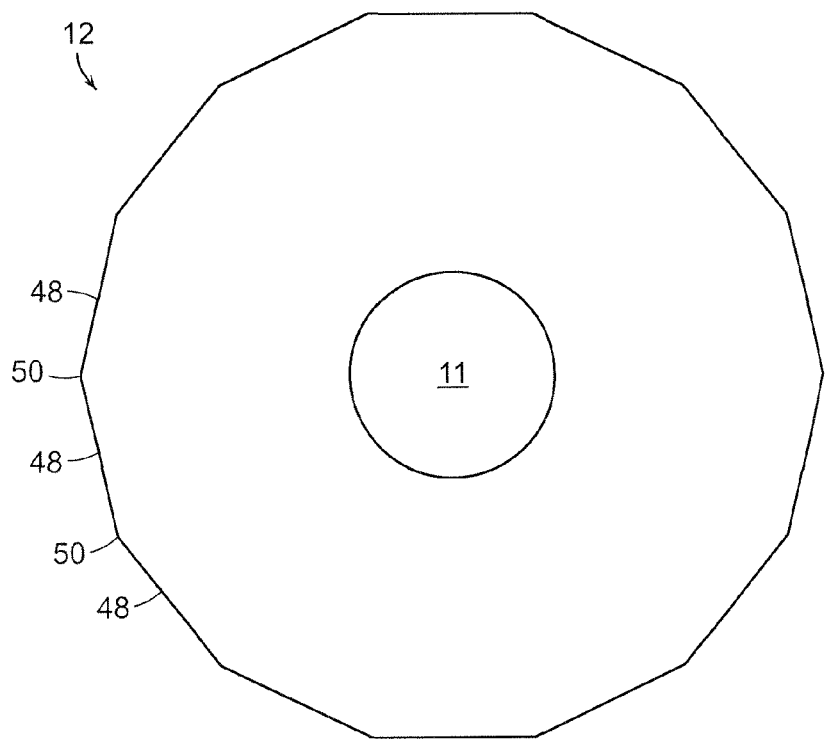
FIGS. 2A and 2B are plan and cross sectional views, respectively, of an electrically-conductive rupture disc component of the modular current interrupt device of FIG. 1.
Figure 2B:
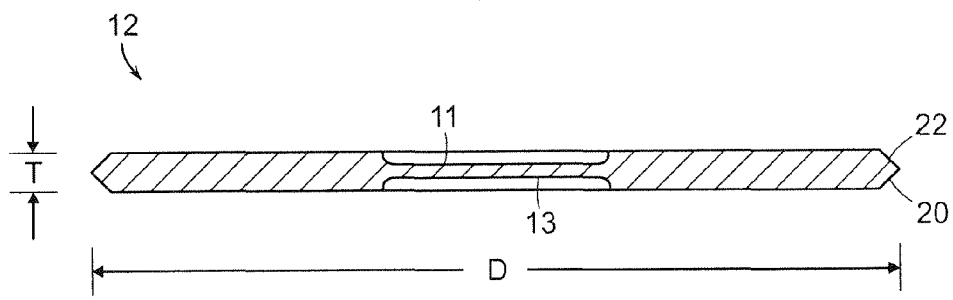
Figure 11:
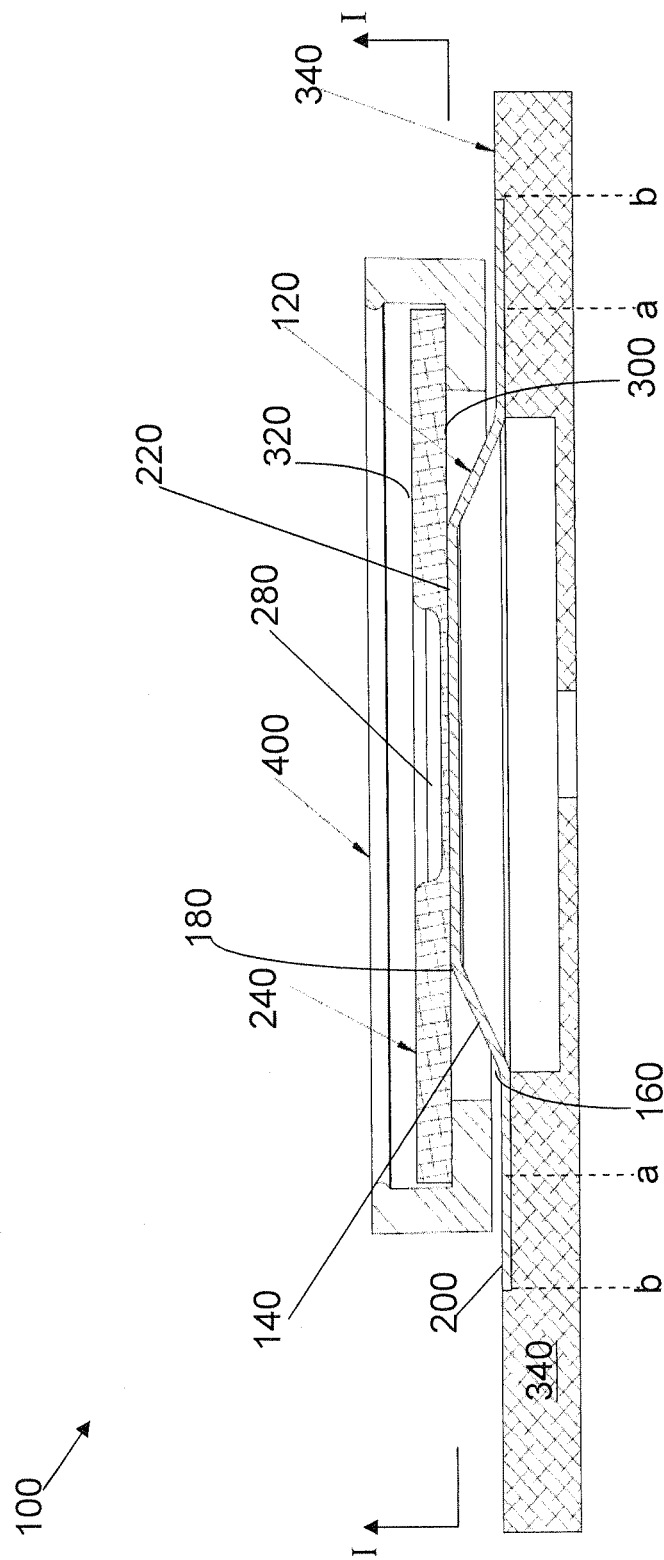
FIG. 11 is a cross-sectional view of one embodiment of a CID of the invention.

As shown in FIGS. 2A and 2B, electrically-conductive rupture disc 12 includes central recessed portions 11, 13, each of which, independently, has a depth in a range of between about 0.16 mm and about 0.26 mm, and a width in a range of between about 2.95 mm and about 3.05 mm. Alternatively, as shown in FIG. 11, electrically-conductive rupture disc 240 can include a single central recessed portion 280. Electrically-conductive rupture disc 12, as shown in FIG. 2A, is a polygon. Although shown having fourteen sides in FIG. 2A, electrically-conductive rupture disc 12 typically can have between about 10 and 20 sides 48. Sides 48 of electrically-conductive rupture disc 12 intersect and thereby define retention points 50. Optionally, or alternatively, rupture disc 12 includes vent through-holes, not shown. Beveled edges 20, 22 of rupture disc 12 have an angle to a major plane of rupture disc 12 that is typically in a range of between about 40 degrees and 55 degrees. Preferably, the angle of beveled edges 20, 22 is in a range of between about 45° and about 49°, and most preferably is about 47°. Typically, rupture disc 12 has a major diameter D in a range between about 6 mm and about 16 mm and a thickness T in a range between about 0.3 mm and 0.7 mm. Preferably, rupture disc 12 has a diameter of about 11 mm and a thickness of about 0.5 mm. The thickness of rupture disc 12 at recessed portions 11, 13 generally is in a range of between about 0.065 mm and preferably about 0.085 mm. Rupture disc 12 is fabricated of a suitable material. Examples of suitable materials include aluminum, nickel and copper. Examples of suitable materials include Aluminum 3003 series, such as Aluminum 3003H-0 or H-14 series, and preferably H-14 series.

Referring back to FIG. 1, electrically-conductive pressure disc 14 is attached to electrically-conductive rupture disc 12 at weld points 24, 26. Optionally, electrically-conductive pressure disc 14 can be connected to electrically-conductive rupture disc 12 without any weld points, a single weld point, or three or more weld points. Typically, the weld points are spot welds. Preferably the spot welds are separated from each other. In a particularly preferred embodiment the spot welds include aluminum.

Figure 3A:
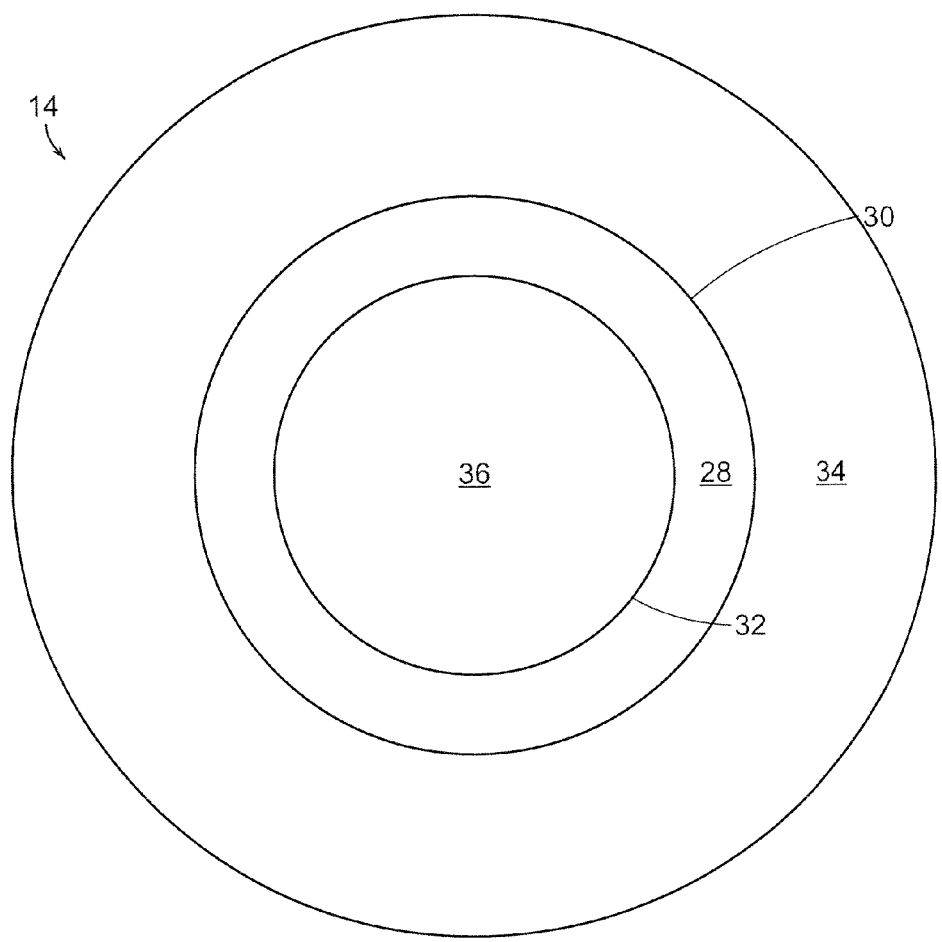
FIGS. 3A and 3B are plan and cross sectional views, respectively, of an electrically-conductive pressure disc component of the modular current interrupt device of FIG. 1.
Figure 3B:
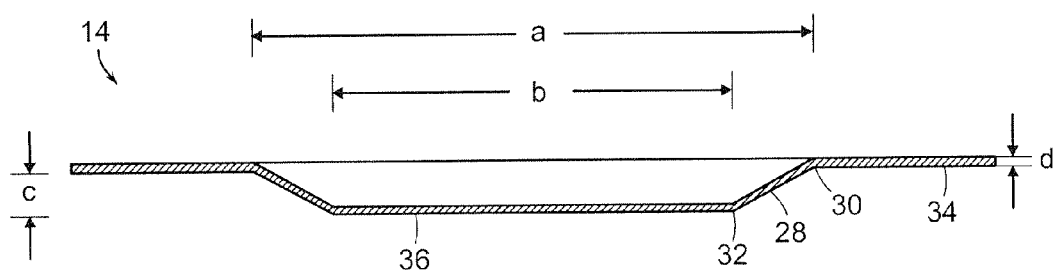
Figure 10:
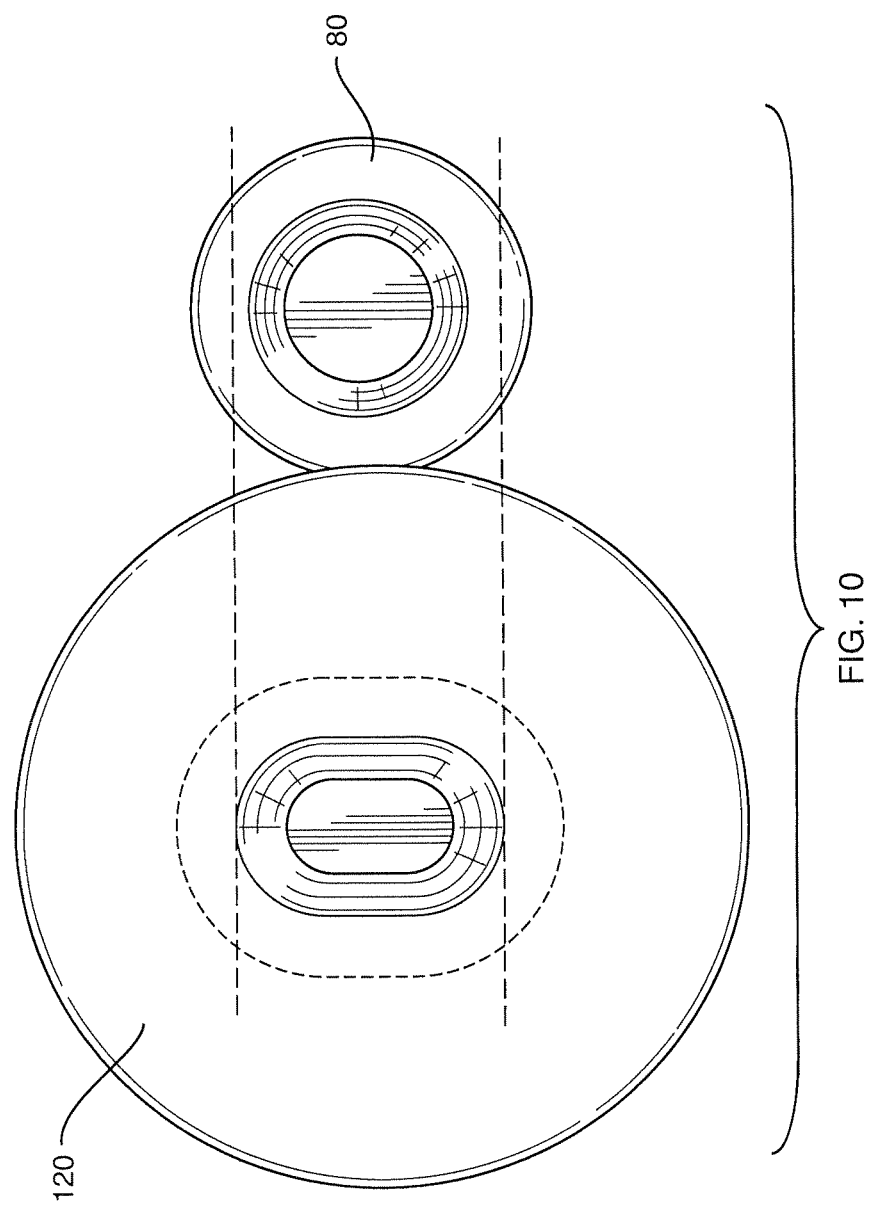
FIG. 10 is a plan view of an elongated, or oblong, pressure disc of the invention, having a frustum variant-type shape, shown next to a circular pressure disc having a frustum shape that is not a variant.

Although other configurations of electrically-conductive pressure discs can be employed in the modular current interrupt device of the invention, electrically-conductive pressure disc 14, as shown in FIGS. 3A and 3B, preferably includes frustum 28. Frustum or frustoconical component 28 has first end 30 and second end 32. First end 30 has a broader diameter than second end 32. Electrically-conductive pressure disc 14 also includes base 34 extending radially from a perimeter of first end 30 of frustum 28. Cap 36 seals second end 32 of frustum 28. As used herein, the term "frustum" means the basal wall part (excluding the bottom and top ends) of a solid right circular cone (i.e., solid generated by rotating a right triangle about one of its legs) the top of which is cut off. In one embodiment, cap 36 is essentially planar. In an alternative embodiment, not shown, frustum 28 can be a frustum variant, such as where a cross-section of first end 30 or second 32 is each, independently, non-circular. In one embodiment, the cross-section of each of first and 30 and second and 32 is oblong, as indicated at FIG. 10 with reference to pressure disc 120.

As used herein, the term "essentially planar or cap" means a surface that sufficiently resembles a plane so as to potentially contact another planar surface randomly at one or more points and to which the surface can be fused by a suitable means, such as by spot welding. Returning to FIGS. 3A and 3B, in some embodiments, despite deformation caused by fabrication of pressure disc 14 or by assembly to form modular current interrupt device 10, shown in FIG. 1 (e.g., by welding electrically-conductive rupture disc 12 to electrically-conductive pressure disc 14), cap 36 nevertheless is considered to be essentially planar.

A forming pin deforms both cap 36 on pressure disc 14 and coined feature 11 on rupture disc 12 at the same time. Next, pressure disc 14 is attached to rupture disc 12 to form an electrically conductive pathway. Preferably, pressure disc 14 and rupture disc 12 are spot welded together with the number of weld spot locations in the range of between 1 and about 6, such as 2 weld spots. Preferably, laser welding is used. Preferably, the laser welding equipment is set-up to hit each weld spot in rapid succession with multiple repeated laser pulses. The energy of each of the repeated laser pulses is adjusted so that the combined energy of all repeated laser pulses in one weld spot is sufficient to locally melt the aluminum in pressure disc 14 and rupture disc 12, thereby binding them metallically together in a weld spot. The advantage of using multiple repeated laser pulses is that the variation in the total laser energy provided to each weld spot is significantly reduced, thereby creating less variation in the spot weld strength, compared to using a single laser pulse of higher power.

Preferably, cap 36 and/or base 34 each, independently, has a thickness of material (indicated with reference character "d" in FIG. 3B) in a range between or about 0.05 mm and about 0.5 mm such as between about 0.05 mm and about 0.3 mm, between about 0.05 mm and 0.2 mm, between about 0.05 mm and about 0.15 mm (e.g., about 0.127 mm) or about 5 milli-inches.

Preferably, the diameter of cap 36 (indicated with reference character "b" in FIGS. 3A and 3B) is in a range of between about 2 mm and about 10 mm, more preferably between 5 mm and about 10 mm, even more preferably between about 5 mm and about 10 mm even more preferably between about 5 mm and about 8 mm (e.g., between about 0.20 inches and 0.25 inches) such as about 5.5 mm (or about 0.215 inches).

Preferably, the surface of cap 36 is elevated from peripheral base 34. The height of cap 36 from base 34 (indicated with reference character "c" in FIG. 3B) is in a range of between about 0.5 millimeter and about 1 millimeter, more preferably between about 0.55 millimeter and about 0.65 millimeter, such as about 0.596 millimeter (or about 0.024 inch).

Preferably, frustum 28 has an angle relative to a plane parallel to base 34 in a range of between about 15 degrees and about 25 degrees, such as between about 18 degrees and about 23 degrees, or between about 19 degrees and about 21 degrees. More preferably, frustum 28 has an angle of about 21 degrees relative to a plane parallel to base 34. Preferably, frustum 28 has a diameter ratio of first end 30 to second end 32 (i.e., ratio of "b" to "a" in FIG. 3B) in a range of between about 1:1.20 and about 1:1.35, such as between about 1:1.23 and about 1:1.28.

Referring back to FIG. 1, electrically-conductive rupture disc 12 and electrically-conductive pressure disc 14 separate when an internal gauge pressure applied to a surface of electrically-conductive pressure disc 14 contacting electrically-conductive rupture disc 12 is in a range of between about 4 $kg/cm^2$ and about 10 $kg/cm^2$, such as between about 4 $kg/cm^2$ and about 9 $kg/cm^2$, between about 5 $kg/cm^2$ and about 9 $kg/cm^2$ or between about 7 $kg/cm^2$ and about 9 $kg/cm^2$. Separation of electrically-conductive pressure disc 14 from electrically-conductive rupture disc 12 activates modular current interrupt device 10. As used herein, "activation" of modular current interrupt device 10 means that current flow between electrically-conductive rupture disc 12 and electrically-conductive pressure disc 14 is interrupted. Preferably, when electrically-conductive pressure disc 14 separates from electrically-conductive rupture disc 12, the integrity of electrically-conductive pressure disc 14 is maintained, whereby pressure disc 14 does not fracture or otherwise permit gas to flow from one side of pressure disc 14 to another side of pressure disc 14. Typically, separation of pressure disc 14 from rupture disc 12 causes fracture of any spot welds electrically connecting pressure disc 14 to rupture disc 12.

Pressure disc 14 can be formed of a suitable metal such as aluminum, copper and nickel. An example of suitable aluminum is Aluminum 3003 series, such as Aluminum 3003H-0 or H-14 series. Preferably, the pressure disc 14 includes aluminum and, more preferably, consists essentially of aluminum.

Figure 4A:
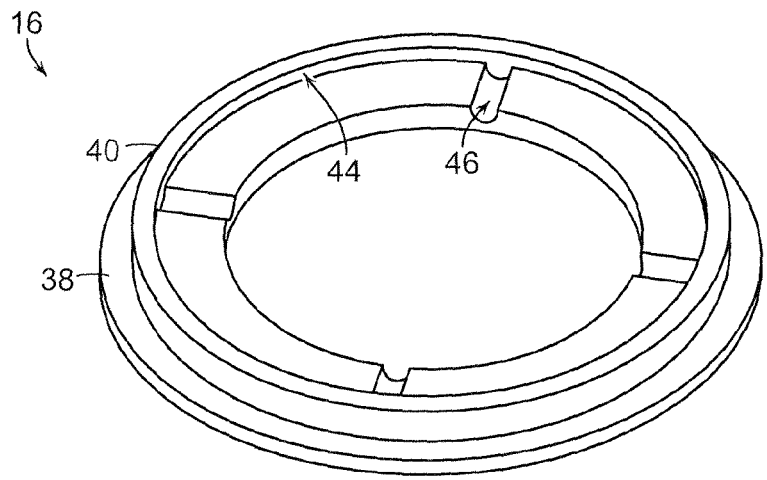
FIGS. 4A, 4B and 4C are perspective, cross-sectional and plan views of one embodiment of an electrically-insulating ring component of the modular current interrupt device of FIG. 1.
Figure 4B:
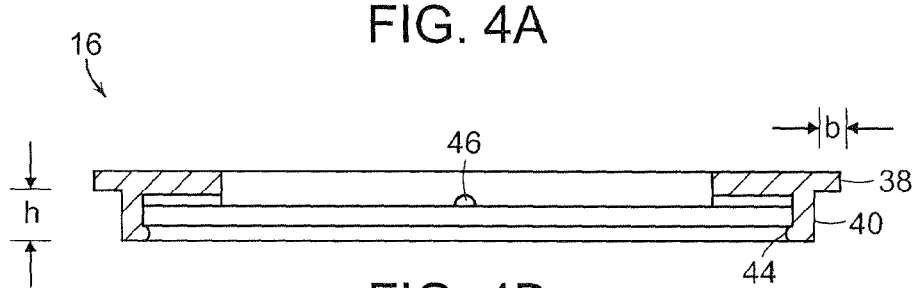
Figure 4C:
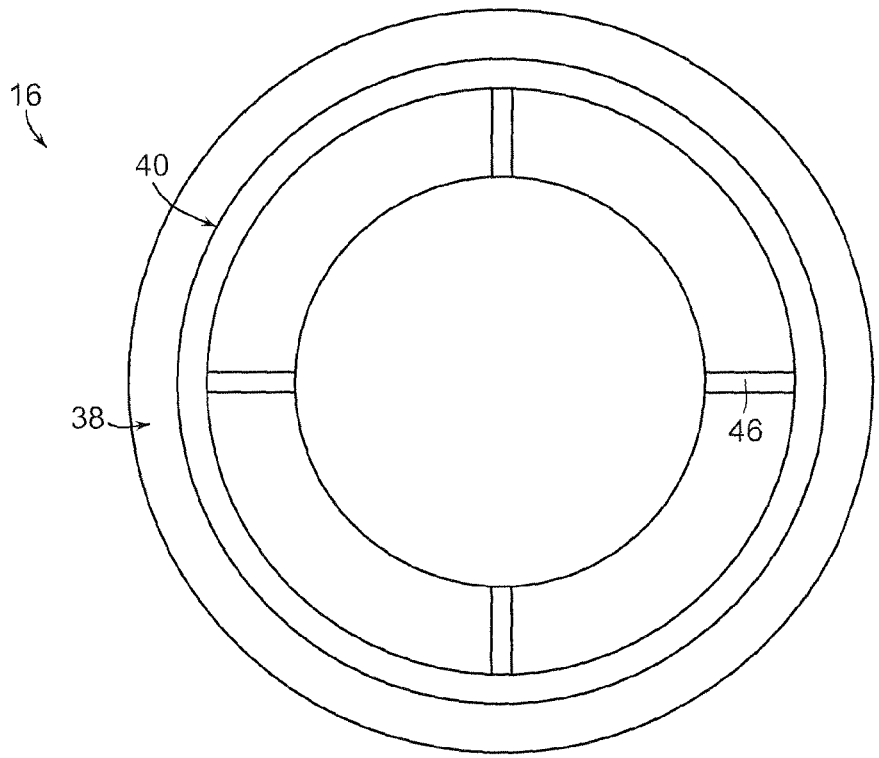

Electrically-insulating ring 16 partitions a perimeter of rupture disc 12 from a perimeter of pressure disc 14. Referring to FIGS. 4A, 4B and 4C, electrically-insulating ring 16 includes base 38 and rim 40. Typically, rim 40 is spaced from perimeter of base 38 by a distance "b" in a range between about 0.40 mm and about 0.55 mm. Rim 40 typically has a height "h" in a range of between about 0.80 mm and about 0.90 mm. Lip 44 extends from rim 40 and overlaps electrically-conductive rupture disc 12. In one embodiment, lip 44 contacts rupture disc 12 to thereby cause an interference fit between base 38 and rupture disc 12. As shown in FIG. 4A, electrically-insulating ring 16 defines channels 46 at base 38. In one embodiment, and as shown in FIG. 4C, at least one of channels 46 has a major axis that is essentially normal to a tangent of a circle defined by ring 16. Examples of suitable materials of electrically-insulating ring 16 include polypropylene, such as high-density polypropylene, and perfluoroalkoxy copolymer resin.

Figure 5:
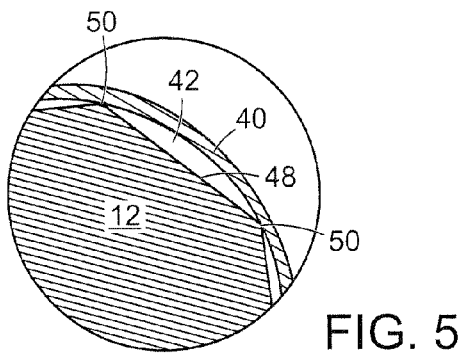
FIG. 5 is a partial cross-sectional view of the modular current interrupt device of FIG. 1, taken along line V-V.

As can be seen in FIG. 5, points 50 of rupture disc 12 typically are in interfering relation with rim 40 of electrically-insulating ring 16. Sides 48 of electrically-conductive rupture disc 12 and rim 40 of electrically-insulating ring 16 define conduits 42 that provide fluid communication of gas pressure from one side of rupture disc 12 to the other side of rupture disc 12. Channels 46 of ring 16 also provide fluid communication between the major surfaces of rupture disc 12.

Seating element, or seating cup, 18 overlays pressure disc 14. Seating element 18, also shown in FIGS. 6A and 6B, includes base 52, and raised portion 54 that defines through-opening 56. Crimp 58 at periphery of seating element 18 secures pressure disc 14 to electrically-insulating ring 16. Optionally, seating element 18 can be secured to pressure disc 14 by welds (not shown) where seating element 18 contacts electrically-conductive pressure disc 14. Preferably the diameter of opening 56 is in a range of between about 2 mm and about 4 mm. Seating element 18 is fabricated of a suitable material, such as aluminum, nickel and copper. Preferably, seating element 18 is formed of metal and is electrically connected to pressure disc 14. In one embodiment, seating element 18 includes aluminum, and more preferably consists essentially of aluminum.

Figure 6A:
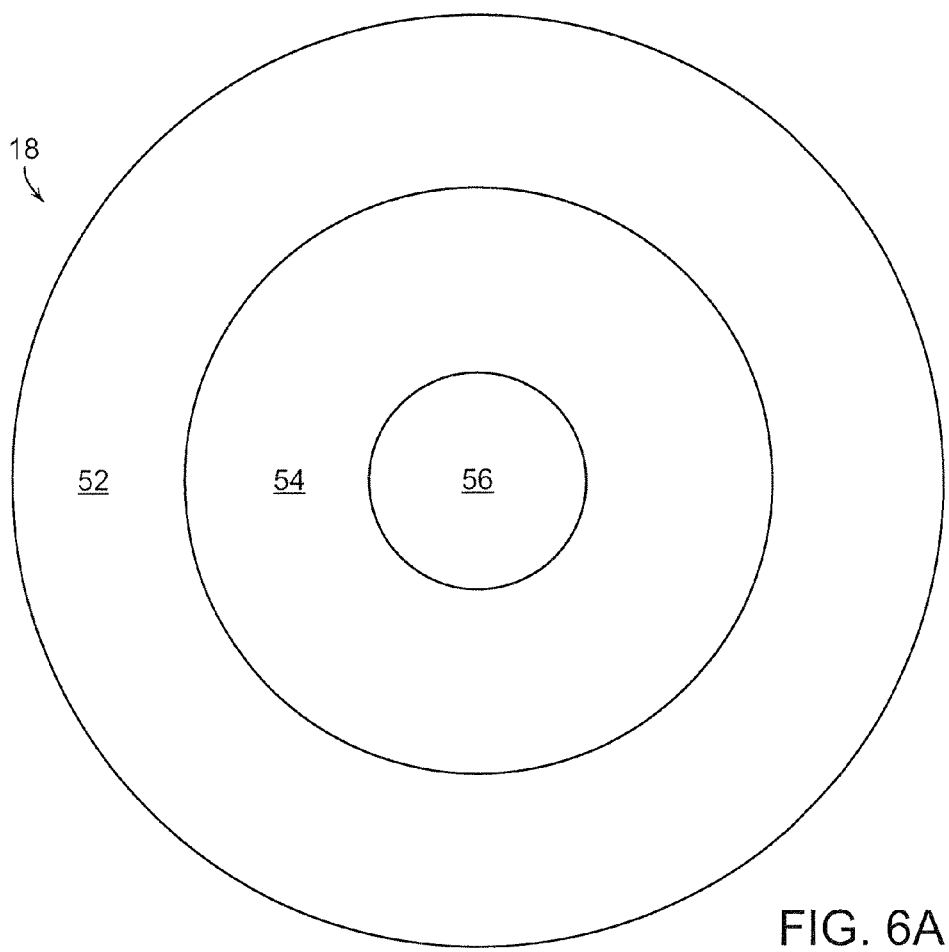
FIGS. 6A and 6B are plan and cross-sectional views, respectively, of a seating element component of the modular current interrupt device of FIG. 1.
Figure 6B:
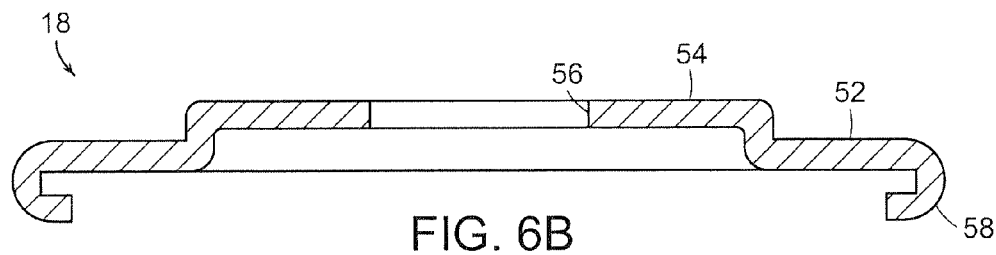

Alternatively, where pressure disc 14 is otherwise connected to an electrical terminal of a battery, such as a battery can, seating element 18 can be formed of an electrically insulating material, such as polypropylene. A plan view of seating element 18, shown in FIG. 6A, shows that seating element 18 is circular in configuration, whereby, in one embodiment, raised portion 54 essentially tracks base 34 of pressure disc 14. Typically, the thickness of the material employed to form seating element 18 is in a range of between about 0.3 mm and about 0.5 mm.

Figure 7A:
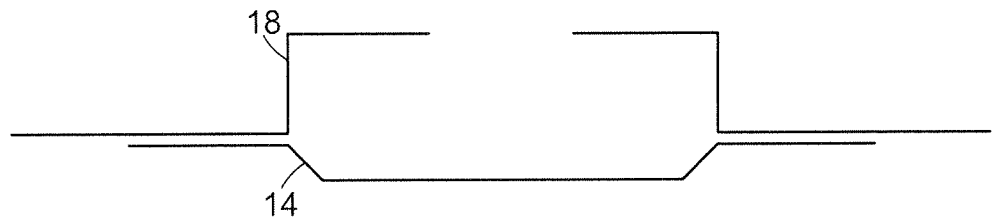
FIGS. 7A through 7D show steps in one method of the invention to fabricate one embodiment of the modular current interrupt device of the invention.
Figure 7B:
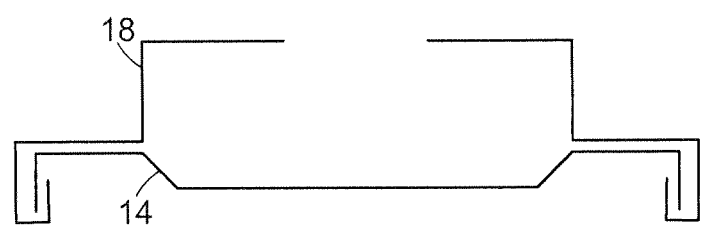
Figure 7C:
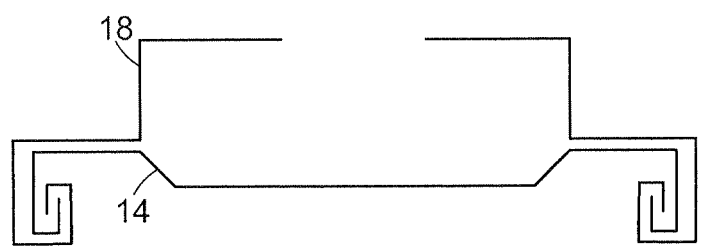
Figure 7D:
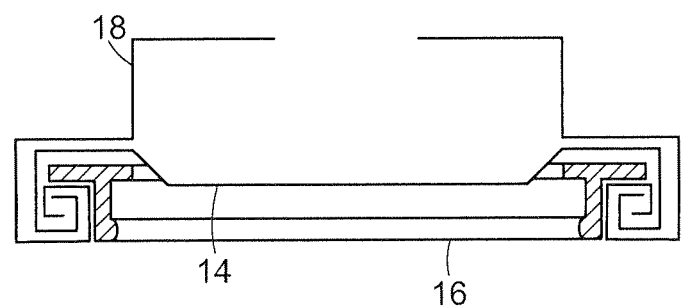

A method of fabricating a modular current interrupt device of the invention includes combining electrically-conductive pressure disc 14 with seating element 18, and combining electrically-conductive rupture disc 12 with electrically-insulating ring 16. The combined electrically-conductive pressure disc 14 and seating element 18, and combined electrically-conductive rupture disc 12 and electrically-insulating ring 16, are then secured to one another by mechanically or by other means joining the electrically-conductive rupture disc 12 and electrically-conductive pressure disc 14 by a suitable method, such as by laser or resistance spot welding. The edges of seating element 18 can be crimped around the edges of pressure disc 14 and insulating ring 16. In another embodiment, shown in FIGS. 7A through 7D, pressure disc 14 and seating element 18 are combined, as shown in FIG. 7A, and then a single seam is formed by a suitable method, such as crimping, as shown in FIG. 7B. Optionally, a suitable lining compound, such as a sealing material (e.g., an asphaltic-based sealing material) that is electrolyte-resistant, as is known in the art, can be placed between joining surfaces of pressure disc 14 and seating element 18. As shown in FIG. 7C, a double seam, as a hermetic seal, is then formed. Insulating ring 16 is then placed at pressure disc 14, and pressure disc 14 and seating element 18 are then crimped again to clamp down insulating ring 14. As shown in FIG. 7D, pressure disc 12 is then put into place, as shown in FIG. 1, and spot welded to pressure disc 14, as described above. Preferably, electrically-conductive pressure disc 14 and electrically-conductive rupture disc 12 are made of substantially the same metals. As used herein, the term "substantially the same metals," means metals that have substantially the same chemical and electrochemical stability at a given voltage, e.g., the operating voltage of a battery.

In one specific embodiment, at least one of electrically-conductive rupture disc 12 and electrically-conductive pressure disc 14 includes aluminum, such as Aluminum 3003 series. In one more specific embodiment, electrically-conductive pressure disc 14 includes aluminum which is softer than that of electrically-conductive rupture disc 12. Preferably, electrically-conductive pressure disc 14 and electrically-conductive rupture disc 12 both include aluminum. More preferably, rupture disc 12 is formed of Aluminum 3003H-14 series and pressure disc 14 is formed of Aluminum 3003H-0 series. Pressure disc 12 and rupture disc 14 can be made by any suitable method known in the art, such as, for example, stamping, coining, and/or milling techniques.

Figure 8A:
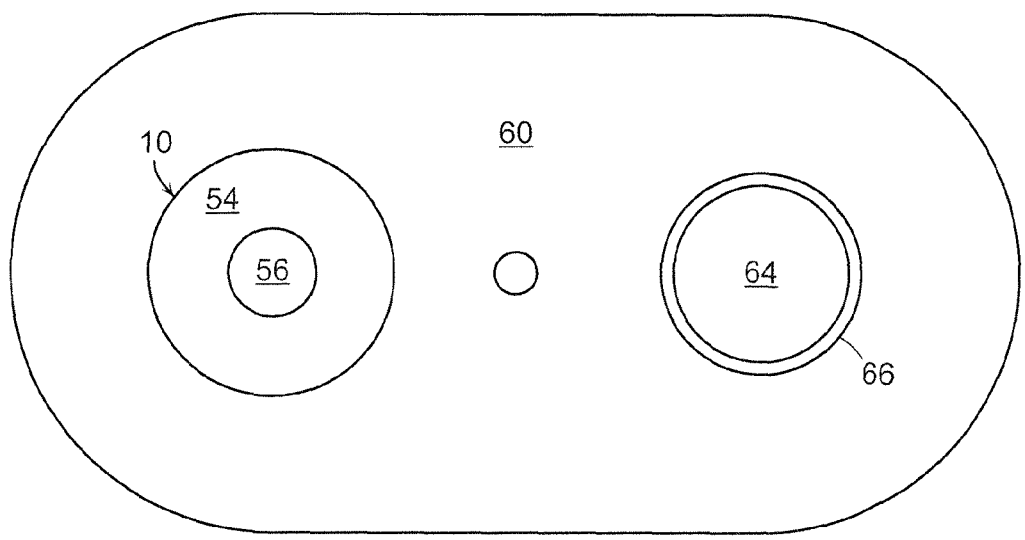
FIGS. 8A, 8B and 8C are exterior, cross sectional, and interior views, respectively, of a lid of a prismatic battery cell showing a modular current interrupt device of the invention affixed to the lid.
Figure 8B:
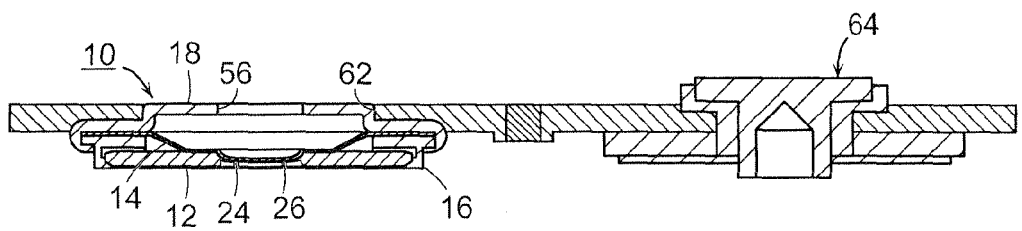
Figure 8C:
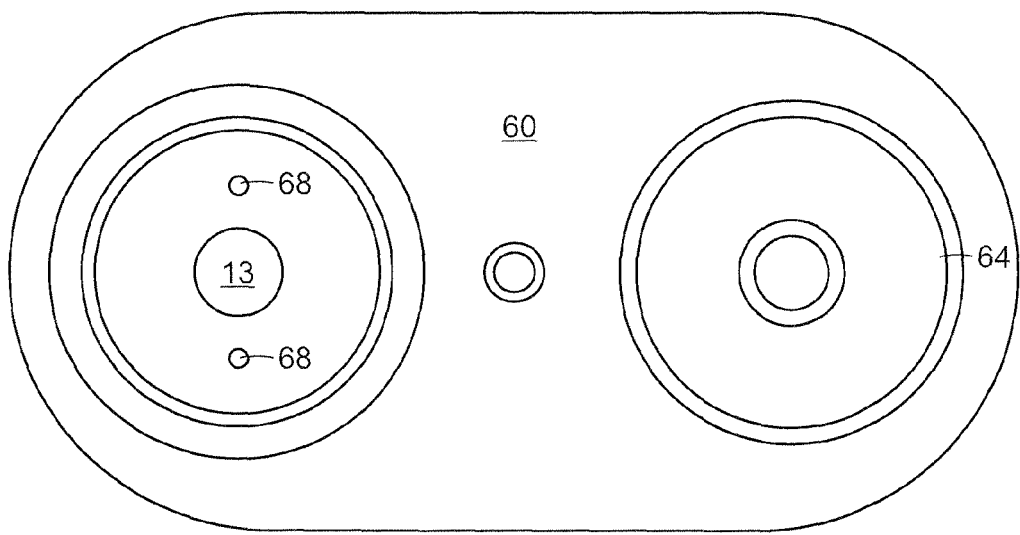

FIGS. 8A, 8B and 8C show, respectively, exterior plan, cross-sectional and interior plan views of a lid assembly of a battery that includes a modular current interrupt device of the invention. As can be seen in FIGS. 8A, 8B and 8C, current interrupt device 10 is set within through-opening 62 defined by lid 60 of a battery. The majority of modular current interrupt device 10 is located within the battery while raised portion 54 of seating element 18 resides within through-opening 62 of lid 60. Seating element 18 is fixed to lid 60 by a suitable method, such as by an interference fit, welding, crimping, riveting, etc. Preferably, seating element 18 and lid 60 are welded to each other. Any suitable welding technique known in the art can be used. Preferably, seating element 18 and lid 60 are hermetically joined. Preferably, a laser welding technique is employed in the invention. More preferably, a circumferential laser welding technique is employed to hermetically join seating element 18 and lid 60, for example, either by means of seam welding at the circumferential interface between two parts or by means of penetration welding at base 62 of seating element 18. Preferably, the welding is circumferentially placed around the middle of base 52 or the edge of base 52. Preferably, during the welding process, e.g., a laser welding process, a temperature of seating element 18 is controlled so as not to exceed the melting point of a surface of seating element 18 opposite the weld. Such temperature control can be obtained using any suitable cooling method known in the art. Preferably, lid 60 is fabricated out of substantially the same material as that of seating element 18, such as Aluminum 3003H-0 or H-14 series.

As can be seen in FIG. 8A, which is a plan view of the outside of lid 60 of a battery, raised portion 54 of seating element 18 is visible and essentially circular in configuration. Typically, seating element 18, as well as the remainder of lid 60 and a can of a battery to which lid 60 is electrically connected, serves as a positive terminal, whereas feed-through assembly 64, also shown in FIG. 8A through 8C, serves as the negative terminal of the battery and is electrically insulated by component 66 from the remainder of lid 60, from modular current interrupt device 10 and from a can of a battery to which lid 60 is electrically connected.

Figure 9:
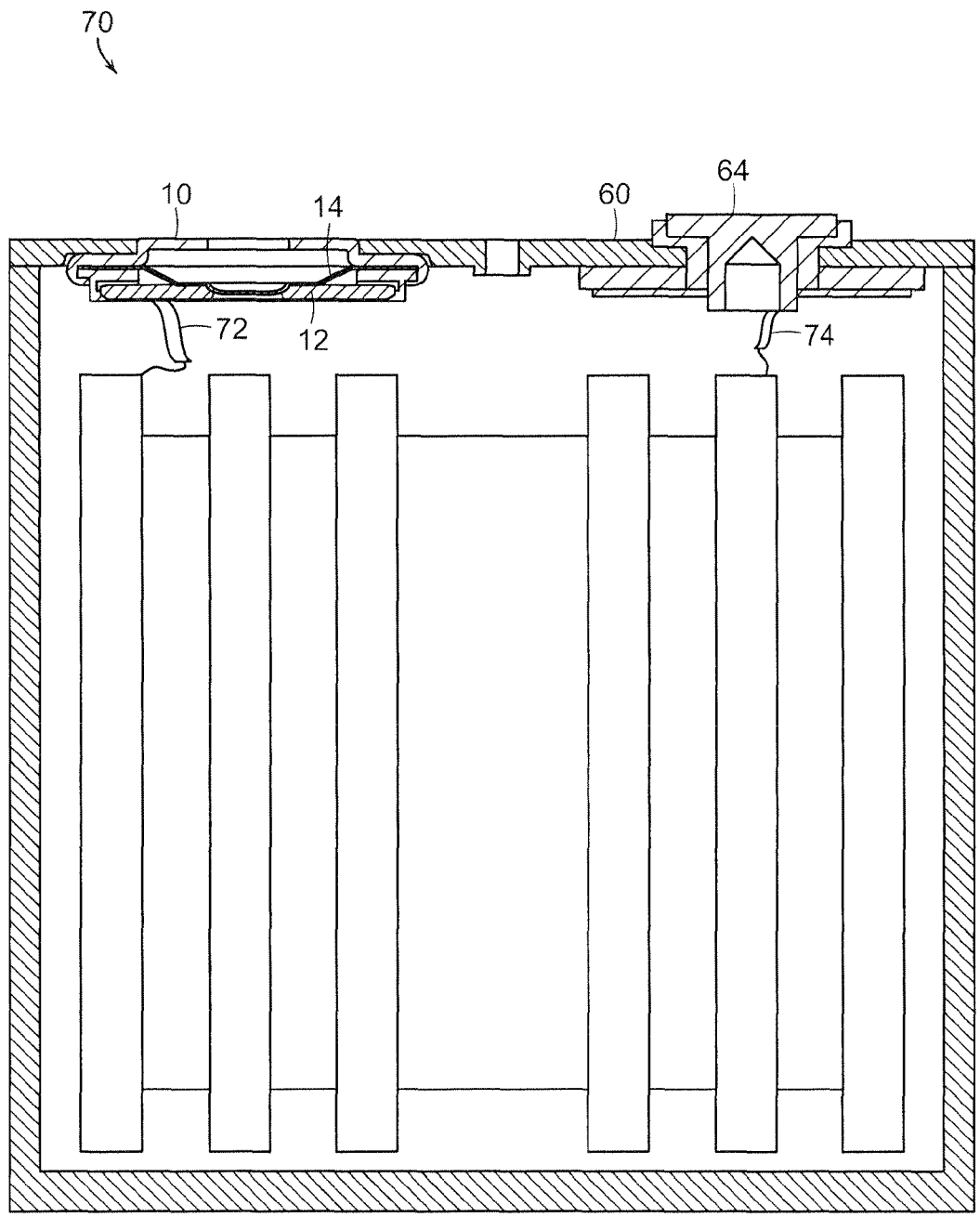
FIG. 9 is a cross sectional view of a prismatic battery cell of the invention, showing a modular current interrupt device of the invention, also in cross section, set in place in the lid.

FIG. 9 shows a cross-sectional view of a battery 70 of the invention that includes lid 60, in which modular current interrupt device 10 is seated. Tab 72 connects one electrode, preferably a positive electrode, to rupture disc 12. Tab 72 can be joined to rupture disc 12 by a suitable method, such as laser or resistance spot welding. Tab 74 connects the other electrode to feed-through assembly 64, also by a suitable method, such a laser or resistance spot welding.

Optionally, the electrically conductive components of modular current interrupt device 10 can be formed of materials other than aluminum such as nickel-plated iron, particularly when the current interrupt device 10 is electrically connected to the anode of the battery, rather than to the cathode.

In another embodiment, a pressure disc of non-circular shape provides a larger surface area as compared to a circular pressure disc that fits in the same size (non circular) envelope. The larger available area allows for a lower activation pressure compared to a circular pressure disc that fits in the same rectangular envelope base.

As the cell design moves from circular to prismatic, the space available for the pressure disc decreases. For thin form factor prismatic cells in particular, the maximum size of a circular pressure disc is so small that the force due to the pressure is insufficient to actuate the pressure mechanism in the preferred pressure range. Making the pressure disc material very thin could bring the reversal pressure down to the preferred range. However, using very thin material weakens the structural integrity of the pressure disc and increases the risk of punctures and leaks.

The elongated, or oblong, disc 120 of the invention is shown in FIG. 10, and is shown in comparison to a pressure disc 80 having a circular cross-section at both first and second ends of a frustum. Table 1 below shows the results of tests of an elongated pressure disc of the invention. The elongated, or oblong, shape of the disc increases the area available for the pressure force as compared to a circular pressure disc that a given prismatic cell could accommodate, therefore improving the sensitivity of the pressure disc and allowing operation with a thin form factor prismatic cell.

TABLE 1

Elongated Pressure Disc Prototype Sample
Reversal Pressure Observations

| Elongated Pressure Disc Prototype Sample No. [—] | Observed Activation (i.e. reversal) Pressure [psig] |
|---|---|
| 1 | 85 |
| 2 | 85 |
| 3 | 76 |
| 4 | 82 |
| 5 | 62 |
| 6 | 82 |
| 7 | 65 |
| 8 | 80 |
| 9 | 79 |
| 10 | 60 |

Material: Aluminum 3004 - H0. Material Thickness: 0.005"
Cone base dimensions: 6 × 9 mm
Pressurizing Medium: Helium. Room Temperature In some embodiments, the CID of the battery of the invention, which employs a pressure disc and a rupture disc that is in electrical communication with, and pressure (i.e., fluid such as gas) communication with, the pressure disc and with the battery can of the battery, activates at an internal gauge pressure in a range of, for example, between about 4 kg/cm$^2$ and about 9 kg/cm$^2$, such as between about 5 kg/cm$^2$ and about 9 kg/cm$^2$ or between about 7 kg/cm$^2$ and about 9 kg/cm$^2$. In these embodiments, preferably, the pressure disc includes a cone- or dome-shaped part. More preferably, at least a portion of the top (or cap) of the cone- or dome-shaped part is essentially planar. Preferably, the pressure disc and the rupture disc are in direct contact with each other at a portion of the essentially planar cap. More preferably, the pressure disc includes a frustum having an essentially planar cap. As used herein, "activation" of the CID means that current flow of an electronic device through the CID is interrupted. In a specific embodiment, the CID of the invention includes a pressure disc and a rupture disc in electrical communication with each other (e.g., by welding, crimping, riveting, etc.). In this CID, "activation" of the CID means that the electrical communication between the pressure disc and the rupture disc is interrupted. Preferably, when the rupture disc separates from (e.g., deforms away or is detached from) the pressure disc, no rupture occurs in the pressure disc.

FIG. 11 shows a cross-section of one specific embodiment of the CID of the invention. CID 100 shown in FIG. 10 includes pressure disc 120 and rupture disc 240. Pressure disc 120 includes frustum variant 140 (also referred to as frustum 140) that includes first end 160 and second end 180. Frustum variant has a cross-sectional shape (such as that taken along line I-I with respect to second end 180) that is non-circular, such as an elongated, or oblong shape, shown in FIG. 10, at least one of first end 160 or second end 180. First end 160 has broader dimensions than second end 180. Pressure disc 120 also includes base 200 extending radially from a perimeter of first end 160 of frustum 140. Essentially planar cap 220 seals second end 180 of frustum 140. As used herein, the term "frustum variant" means the basal wall part (excluding the bottom and top ends) of a solid right non-circular cone which lies between two parallel planes cutting the cone. In other words, the frustum variant would be a right circular cone, but for the fact that the base or the cross-section of the portion of the cone that has been truncated, is not circular, but rather, elongated, or oblong, as shown in the left-hand portion of FIG. 10, or some other non-circular shape. The length and width of the base of the elongated cone can have a ratio in a range of between about 1:1.3 and about 1:2, preferably about 1:1.5, as shown in FIG. 10.

Figure 12:
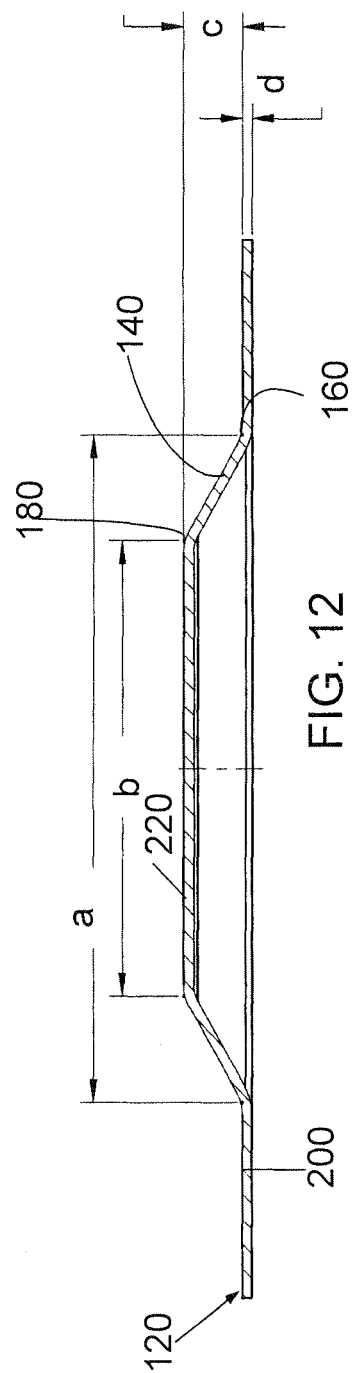
FIG. 12 shows one embodiment of a pressure disc of the CID of FIG. 11.

Preferably, flat cap 220 and/or base 200 has a thickness (indicated with reference character "d" in FIG. 12) in a range of between about 0.05 millimeters and about 0.5 millimeters, such as between about 0.05 millimeters and about 0.3 millimeters, between about 0.05 millimeters and 0.2 millimeters, between about 0.05 millimeters and about 0.15 millimeters (e.g., about 0.127 millimeter (or about 5 milli-inch)).

Preferably, the narrowest dimension of flat cap 220 (indicated with reference character "b" in FIG. 12) is in a range of between about 1 millimeters and about 10 millimeters, more preferably between 2 millimeters and about 10 millimeters, even more preferably between about 2 millimeters and 6 millimeters, such as about 3 millimeters.

Preferably, the height of essentially planar cap 220 from base 200 (indicated with reference character "c" in FIG. 12) is in a range of between about 0.5 millimeter and about 1 millimeter, more preferably between about 0.6 millimeter and about 0.8 millimeter, such as about 0.762 millimeter (or about 0.315 inch).

Preferably, frustum 140 has an angle relative to a plane parallel to base 200 in a range of between about 15 degrees and about 25 degrees, such as between about 18 degrees and about 23 degrees, or between about 19 degrees and about 21 degrees. More preferably, frustum 140 has an angle of about 21 degrees relative to a plane parallel to base 20. Preferably, frustum 140 has a diameter ratio of first end 160 to second end 180 (i.e., ratio of "b" to "a" in FIG. 12) in a range of between about 1:1.20 and about 1:1.35, such as between about 1:1.23 and about 1:1.28.

EQUIVALENTS

While this invention has been particularly shown and described with references to example embodiments thereof, it will be understood by those skilled in the art that various changes in form and details may be made therein without departing from the scope of the invention encompassed by the appended claims.

What is claimed is:

1. A modular current interrupt device for a battery, comprising:
   a) an electrically-conductive rupture disc;
   b) an electrically-conductive pressure disc attached to the rupture disc to form an electrical pathway;
   c) an electrically-insulating ring partitioning a perimeter of the rupture disc from a perimeter of the pressure disc; and
   d) a seating element, the seating element securing the electrically-insulating ring to the pressure disc, wherein the rupture disc and the electrically-insulating ring only together define a conduit, whereby exposure of one side of the pressure disc to sufficient force through the conduit will cause the pressure disc to separate from the rupture disc to thereby sever the electrical pathway.

2. The modular current interrupt device of claim 1, wherein the seating element is electrically conductive and electrically connected to the pressure disc.

3. The modular current interrupt device of claim 1, wherein the rupture disc includes a plurality of retention points that form an interference fit with the electrically-insulating ring.

4. The modular current interrupt device of claim 3, wherein the perimeter of the rupture disc is a polygon.

5. The modular current interrupt device of claim 4, wherein the polygon defines the retention points.

6. The modular current interrupt device of claim 4, wherein the polygon has from 10 sides to 20 sides.

7. The modular current interrupt device of claim 6, wherein the polygon has 14 sides.

8. The modular current interrupt device of claim 1, wherein the conduit is defined in part by the perimeter of the rupture disc.

9. The modular current interrupt device of claim 8, wherein the perimeter of the rupture disc is beveled.

10. The modular current interrupt device of claim 8, wherein the perimeter of the rupture disc includes a double bevel.

11. The modular current interrupt device of claim 10, wherein the angle of at least one of the bevels is in a range of between about 40 degrees and about 55 degrees.

12. The modular current interrupt device of claim 11, wherein the angle of a least one of the bevels is about 47 degrees.

13. The modular current interrupt device of claim 12, wherein the angle of both bevels is about 47 degrees.

14. The modular current interrupt device of claim 1, wherein the electrically insulating ring defines a lip at a periphery of the ring, whereby the lip overlaps the periphery of the rupture disc.

15. The modular current interrupt device of claim 14, wherein the rupture disc defines a groove at the periphery of the rupture disc, whereby the lip of the insulating ring overlaps the rupture disc at the groove.

16. The modular current interrupt device of claim 15, wherein a surface of the lip of the insulating ring is essentially flush with a surface of the rupture disc.

17. The modular current interrupt device of claim 1, wherein the electrically insulating ring defines at least one channel that, together with the rupture disc, defines at least a portion of the conduit.

18. The modular current interrupt device of claim 17, wherein the channel has a major axis that is essentially normal to a tangent of a circle defined by the electrically-insulating ring.

19. The modular current interrupt device of claim 1, wherein the rupture disc, the pressure disc and the seating element are aluminum.

20. The modular current interrupt device of claim 1, wherein the electrically-insulating ring includes a polymer.

21. The modular current interrupt device of claim 1, wherein the rupture disc defines at least one conduit.

22. The modular current interrupt device of claim 1, wherein the electrically-insulating ring defines at least one conduit at a periphery of the ring, whereby fluid communication exists between a frustoconical component of the pressure disc and an external surface of the current interrupt device.

23. The modular current interrupt device of claim 1, wherein the pressure disc includes a frustoconical component.

24. The modular current interrupt device of claim 23, wherein the pressure disc further includes an elevated surface and a peripheral base, the elevated surface being linked to the peripheral base by the frustoconical component, and wherein the rupture disc is electrically connected to the pressure disc at the elevated surface.

25. The modular current interrupt device of claim 24, wherein the pressure disc is electrically connected to the rupture disc at at least one point.

26. The modular current interrupt device of claim 25 wherein the point includes a weld.

27. The modular current interrupt device of claim 1, wherein the seating element is electrically-conductive.

28. The modular current interrupt device of claim 27, wherein the pressure disc is in electrical communication with the seating element.

29. The modular current interrupt device of claim 28, wherein the seating element secures the electrically-insulating ring to the pressure disc by a crimp at a periphery of the seating device.

30. The modular current interrupt device of claim 1, wherein the seating element defines a seating element conduit.

31. The modular current interrupt device of claim 1 wherein the rupture disc defines the conduit.

32. The modular current interrupt device of claim 1, wherein the electrical connection between the rupture disc and the pressure disc is severed when a gauge pressure applied to a surface of the pressure disc facing the rupture disc is in a range of between about 4 kg/cm$^2$ and about 9 kg/cm$^2$ or between about 7 kg/cm$^2$ and about 9 kg/cm$^2$.

33. The modular current interrupt device of claim 1, wherein the pressure disc includes:
   i) a frustum variant, having a first and a second end, the first end having a broader diameter than the second end, at least one of the first and second end varying from a frustum variant in that a cross-section of the end is not circular,
   ii) a base extending radially from a perimeter of the first end of the frustum variant, and
   iii) an essentially planar cap sealing the second end of the frustum variant.

34. The modular current interrupt device of claim 33, wherein the cross-section at least one of the first end and second end is oblong.

35. The modular current interrupt device of claim 33, wherein the cross-section of both the first and second end is non-circular.

36. The modular current interrupt device of claim 33, wherein the cross-section of both the first and second end is oblong.

37. The modular current interrupt device of claim 33, wherein the rupture disc is in electrical contact with the essentially planar cap of the pressure disc through a weld.

38. The modular current interrupt device of claim 37, wherein the weld connecting the pressure disc and the rupture disc ruptures when a gauge pressure between the discs is in a range of between about 4 kg/cm$^2$ and about 9 kg/cm$^2$.

39. The modular current interrupt device of claim 37, wherein the weld ruptures when a gauge pressure between the discs is in a range of between about 7 kg/cm$^2$ and about 9 kg/cm$^2$.

40. The modular current interrupt device of claim 37, wherein the rupture disc defines a depression, and wherein the weld is at the depression.

41. The modular current interrupt device of claim 40, wherein the weld is at least one spot weld.

42. The modular current interrupt device of claim 41, wherein at least one of the spot welds includes aluminum.

43. The modular current interrupt device of claim 41, wherein the weld is two spot welds.

44. The modular current interrupt device of claim 33, wherein the rupture disc defines at least one opening.

45. The modular current interrupt device of claim 37, wherein at least one of the pressure disc and the rupture disc includes aluminum.

46. The modular current interrupt device of claim 45, wherein the pressure disc and the rupture disc both include aluminum.

47. The modular current interrupt device of claim 46, wherein the thickness of the cap is in a range of between about 0.05 millimeter and about 0.5 millimeter.

48. The modular current interrupt device of claim 47, wherein the thickness of the cap is about 0.127 millimeter.

49. The modular current interrupt device of claim 47, wherein the diameter of the cap is in a range of between about 2 millimeters and about 8 millimeters.

50. The modular current interrupt device of claim 49, wherein a height of the cap from the base is in a range of between about 0.5 millimeter and about 1 millimeter.

51. The modular current interrupt device of claim 50, wherein the height of the cap from the base is about 0.762 millimeter.

52. The modular current interrupt device of claim 50, wherein the frustum variant has an angle to a plane parallel to the base of the pressure disc in a range of between about 15 degrees and about 25 degrees.

53. The modular current interrupt device of claim 33, further including an electrically insulating ring that extends about the perimeter of the frustum variant and between the base of the pressure disc and the rupture disc.

54. The modular current interrupt device of claim 53, wherein the base of the pressure disc includes at least one tab and wherein the electrically insulating ring defines at least one opening, the tab and the opening being capable of alignment when the insulating ring and the base are concentric, and wherein the tab can be maleably adjusted to secure the insulating ring to the pressure disc.

55. The modular current interrupt device of claim 54, wherein the electrically insulating ring defines a groove about a perimeter of the insulating ring, and further including a metal ring having tabs, whereby the metal ring can rest inside the groove and whereby the tabs can be maleably adjusted and secured to a metal surface on which the pressure disc is resting, thereby securing the insulating ring over the pressure disc.

56. The modular current interrupt device of claim 53, wherein the thickness of the rupture disc proximate to the weld with the pressure disc is less than the thickness of the pressure disc proximate to the weld, more preferably equal to or less than one-half of the thickness of the pressure disc proximate to the weld.

* * * * *

UNITED STATES PATENT AND TRADEMARK OFFICE
CERTIFICATE OF CORRECTION

Page 1 of 1

PATENT NO. : 8,642,195 B2
APPLICATION NO. : 12/695803
DATED : February 4, 2014
INVENTOR(S) : Mimmo Elia et al.

It is certified that error appears in the above-identified patent and that said Letters Patent is hereby corrected as shown below:

In the claims
Column 14, Claim 33, line 37, delete "variant"

Signed and Sealed this
Seventeenth Day of November, 2015

Michelle K. Lee
*Director of the United States Patent and Trademark Office*